C. L. PARISH & F. C. FERRELL.
TRACTION ATTACHMENT FOR AUTOMOBILES.
APPLICATION FILED JUNE 16, 1913.
1,108,221.
Patented Aug. 25, 1914.
2 SHEETS—SHEET 1.
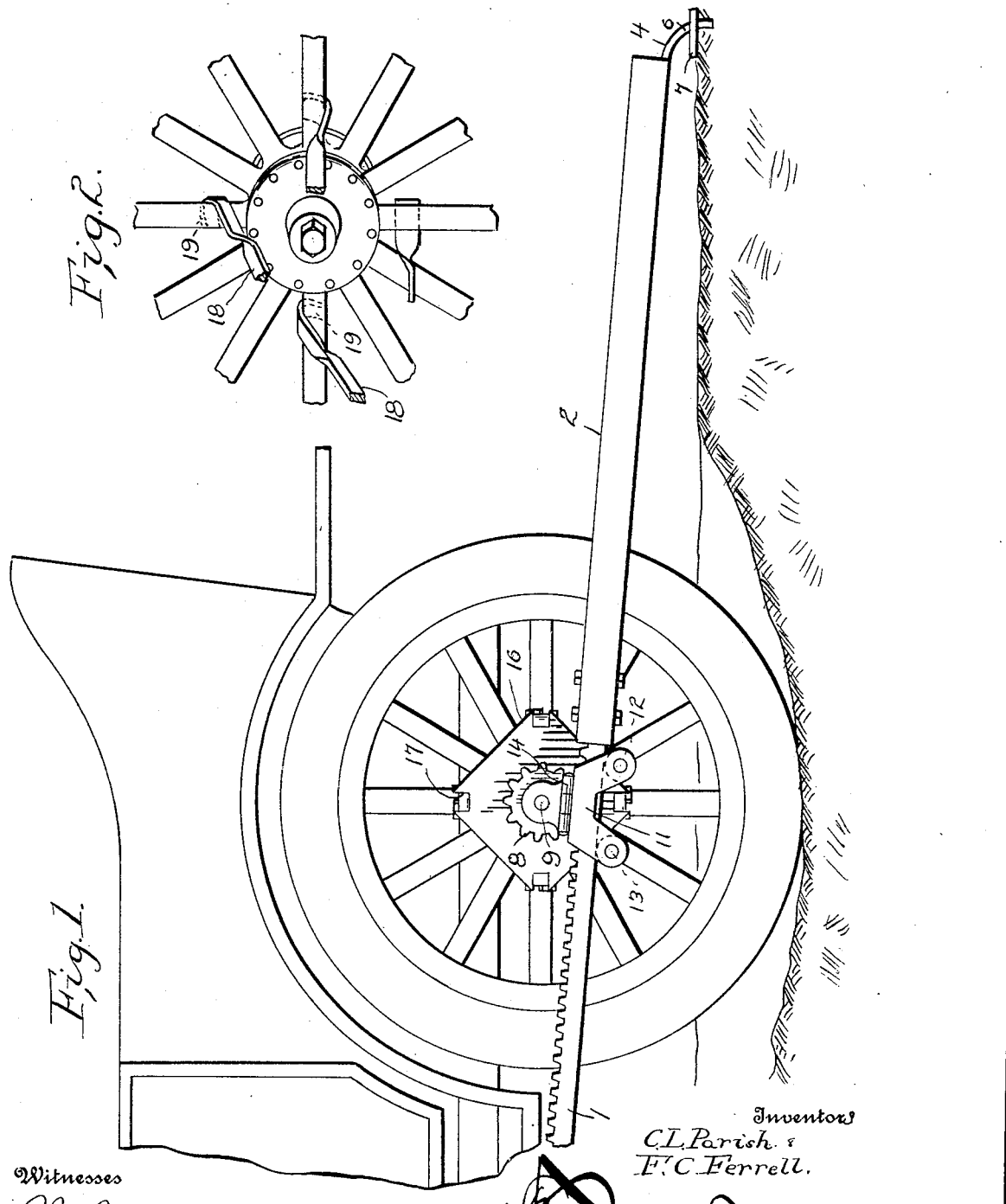
Witnesses
R. N. Jones.
C. L. Laudon.
Inventors
C. L. Parish &
F. C. Ferrell.
By T. Randolph Jr.
Attorney

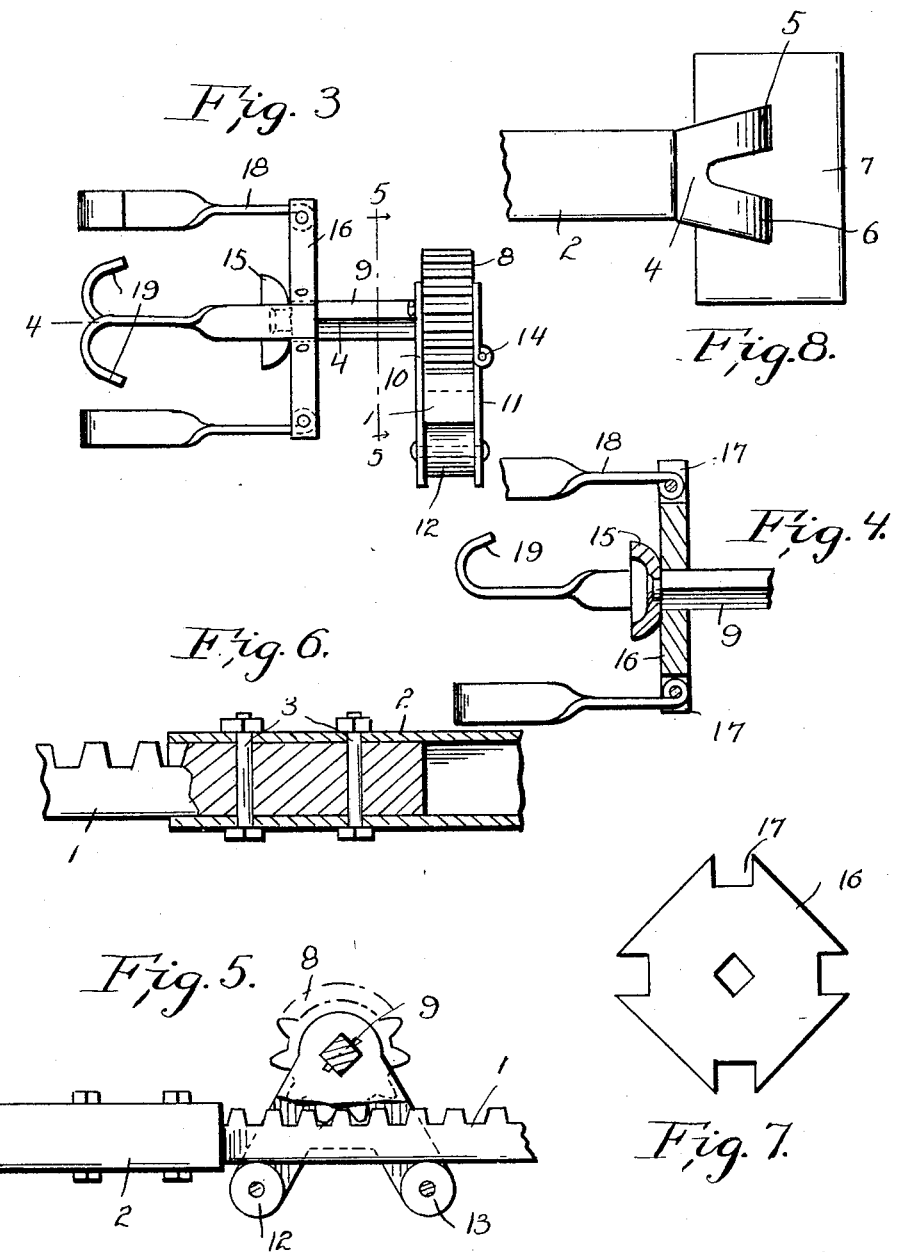

UNITED STATES PATENT OFFICE.

CHEANEY L. PARISH AND FRED C. FERRELL, OF HARRISBURG, ILLINOIS.

TRACTION ATTACHMENT FOR AUTOMOBILES.

1,108,221.

Specification of Letters Patent. Patented Aug. 25, 1914.

Application filed June 16, 1913. Serial No. 774,023.

*To all whom it may concern:*

Be it known that we, CHEANEY L. PARISH and FRED C. FERRELL, citizens of the United States, residing at Harrisburg, in the county of Salina and State of Illinois, have invented certain new and useful Improvements in Traction Attachments for Automobiles; and we do hereby declare the following to be a full, clear, and exact description of the invention, such as will enable others skilled in the art to which it appertains to make and use the same.

This invention relates to new and useful improvements in automobile attachments, and has particular reference to that type of such devices broadly known as traction attachments designed especially for the purpose of affording a gripping surface to the wheels of an automobile when the machine is stalled in a muddy road.

As its principal object this invention contemplates the provision of a device of the character above set forth, which consists essentially in a rack bar, a pinion movable therealong, and means for attaching the pinion to the hub and spokes of one of the rear wheels of an automobile, so that the rotation of the wheel will effect the movement of the pinion along the rack bar.

A further object of this invention is to provide simple and efficient means for attaching the pinion in fixed relation to one of the rear wheels of an automobile, so that it may be quickly applied and as readily disconnected.

A still further object is to provide an elongated casing or housing for the rack bar, so that the rack bar may be drawn out almost entirely from the housing and secured in this position by bolts or other suitable fastening means so that the operative length of the device is increased twofold.

The above and additional objects are accomplished by such means as are illustrated in the accompanying drawings, described in the following specification and then more particularly pointed out in the claims which are appended hereto and form a part of this application.
With reference to the drawings, wherein we have illustrated the preferred embodiment of our invention as it is reduced to practice, and throughout the several views of which similar reference numerals designate corresponding parts: Figure 1 is a side elevation illustrating the traction device of this invention in assembled relation to one rear wheel of an automobile; Fig. 2 is a detail view illustrating the manner in which the spoke hooks are applied; Fig. 3 is a side elevation; Fig. 4 is a section on line 4—4 of Fig. 3; Fig. 5 is a section on line 5—5 of Fig. 3; Fig. 6 is a longitudinal section illustrating the manner in which the rack bar is secured in fixed relation to the housing or casing when in extended position; Fig. 7 is a detail of the hook plate in disassembled position; Fig. 8 is a detail view of the rear terminal of the casing, illustrating the means employed in effecting a gripping engagement of the casing with the road bed.

Proceeding now to the description of the drawings, the numerals 1 and 2 designate, respectively, the rack bar and housing employed in connection therewith. When not in use, the rack bar is normally disposed within the casing 2, which is substantially square in cross section and is formed of hollow sheet metal. When in extended position, the rack bar is, as illustrated in detail in Fig. 6, retained in fixed relation to the casing 2 by means of bolts 3, or other suitable fastening devices which are passed through registering apertures in the casing and inner terminal of the rack bar. In order to effect a secure gripping engagement of the rear terminal of the casing 2 with the road bed, there has been provided a downwardly bent extension plate 4, which is bifurcated at its lower terminal to produce forks, as at 5 and 6. These forks are adapted to be embedded in the ground and are held against abnormal projection into the road bed by a plate 7, which may be formed integrally with the member 4, or secured thereto in any desired manner as may be found most desirable.

As a means for operatively connecting the rear wheel of the automobile to the rack bar, so that when the rear wheel rotates it will move along the member 1, this invention employs a pinion 8, which is operatively connected to the wheel of the automobile by a squared shaft 9, on which the pinion is keyed. The pinion 8 is journaled in apex portions of a pair of substantially V- shaped plates 10 and 11, which are arranged to engage the opposite sides of the rack bar and are provided at their lower terminals with a pair of rollers 12 and 13, the function of which will be obvious upon reference to Fig. 5. The upper portion of the plate 11 is hinged to the lower portion, as at 14, to facilitate the assembling of the parts. When applied to the rack bar, the plates 10 and 11 engage the opposite sides of the bar, the rollers 12 and 13 bear against the lower face of the bar, and the pinion 8 meshes with the teeth on the upper face of the bar.

At the terminal of the squared shaft 9 is secured a hub cup 15, which, when the device is in use, is applied to the hub of the rear wheel and is designed to prevent the shifting of the shaft 9, and consequent shifting of a hook plate 16, which is centrally provided with a squared opening and is slidably mounted on the shaft 9 between the cup 15 and the plate 10. This hook plate 16 is substantially square in the preferred embodiment and is provided at each corner with a notch, as at 17. In each notch of the hook plate is pivotally secured one terminal of a spoke hook 18. These spoke hooks are preferably four in number and are similar in their construction, each being formed of a length of strap metal twisted adjacent its outer terminal through an arc of ninety degrees, and subsequently bent to produce a terminal hook, as at 19. When the hooks are applied to the spokes of the wheel, the hub cup 15 is first pressed against the hub of the wheel and the plate 16 is then moved on the shaft 9 to bring the hooks into the proper relation to the spokes.

From the foregoing the operation of the device will be readily apparent.

When the driver of the machine is stalled in a muddy road and is unable to proceed because of the slipping of the rear wheel, the rack bar 1 is drawn out of the casing 2 and is secured in fixed relation thereto by the bolts 3, as previously described. The pinion 8 and associated parts are then placed on the rack bar and disposed at the bolted terminal thereof. The hub cup 15 and spoke hoops 18 are next applied to the wheel in the manner above described and the engine is started. It will be apparent that the rotation of the wheel of the automobile will rotate the pinion 8 in the direction of the forward end of the rack bar and, consequently, the pinion 8 will move along the rack bar, thus affording a gripping surface for the wheel of the automobile.

In reduction to practice, we have found that the form of our invention, illustrated in the drawings and referred to in the above description, as the preferred embodiment, is the most efficient and practical; yet, realizing that the conditions concurrent with the adoption of our device will necessarily vary, we desire to emphasize the fact that various minor changes in details of construction, proportion and arrangement of parts may be resorted to, when required, without sacrificing any of the advantages of our invention, as defined in the appended claims.

What is claimed is:

1. A traction attachment for automobiles including a rack bar, a housing for said rack bar, means for holding said rack bar in extended relation to said housing, a pinion movable on said rack bar, and means for operatively and detachably connecting said pinion to the rear wheel of an automobile.

2. A traction attachment for automobiles including a rack bar, a housing for said rack bar, means for holding said rack bar in extended relation to said housing, a pinion movable longitudinally of said rack bar, a squared shaft for said pinion, a hook plate splined on said shaft, a plurality of hook members pivotally attached to said hook plate, said hook members being adapted for attachment to the spokes of the rear wheel of an automobile, and a hub cup carried terminally of said shaft and adapted for engagement with the hub of the wheel when the said hooks are in operative relation to the wheel.

3. A traction attachment for automobiles including a rack bar, a housing for said rack bar, said rack bar being slidably mounted in said housing, means for holding said rack bar in extended relation to said housing, a bifurcated road engaging member carried by said housing, a pinion movable longitudinally of said rack bar, and means for operatively connecting said pinion to the rear wheel of an automobile.

4. An automobile traction attachment including a rack bar, a pinion movable longitudinally of said rack bar, a pair of side plates mounted for sliding movement along the sides of said rack bar, said pinion being journaled in the upper portion of said plates, rollers carried by said plates and disposed to engage the under face of said rack bar, and means for detachably connecting the said pinion to the rear wheel of an automobile.

5. A traction attachment for automobiles including a rack bar, a movable pinion on said rack bar, and means for operatively and detachably connecting said pinion to the rear wheel of an automobile.

6. A traction attachment for automobiles including a rack bar, a pinion movable on said rack bar, and means for operatively connecting said pinion to the rear wheel of an automobile.

7. A traction attachment for automobiles including a rack bar, a pinion movable on the rack bar, a bifurcated road engaging member operatively connected with the rack bar, and means for detachably and operatively connecting said pinion to the rear wheel of an automobile.

8. A traction attachment for automobiles including a rack bar, means for detachably connecting the rack bar with the rear wheel of an automobile, and means movable on the rack bar and operatively connected with the rear wheel of an automobile.

In testimony whereof we affix our signatures in presence of two witnesses.

CHEANEY L. PARISH.
FRED C. FERRELL.

Witnesses:
 MATTY E. PARKEY,
 VICTORERS H. ARNOLD.

Copies of this patent may be obtained for five cents each, by addressing the "Commissioner of Patents, Washington, D. C."